(12) United States Patent
Kim et al.

(10) Patent No.: US 9,760,129 B2
(45) Date of Patent: Sep. 12, 2017

(54) ROLLABLE DISPLAY DEVICE

(71) Applicant: SAMSUNG DISPLAY CO., LTD., Yongin-si, Gyeonggi-Do (KR)

(72) Inventors: Youn Joon Kim, Seoul (KR); Jung Hun Lee, Hwaseong-si (KR); Jusuck Lee, Seoul (KR); Kyung Min Choi, Seoul (KR); Sang Jo Lee, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 18 days.

(21) Appl. No.: 14/957,636

(22) Filed: Dec. 3, 2015

(65) Prior Publication Data

US 2016/0239052 A1 Aug. 18, 2016

(30) Foreign Application Priority Data

Feb. 13, 2015 (KR) .......................... 10-2015-0022410

(51) Int. Cl.
  *G06F 1/16* (2006.01)
  *H05K 5/00* (2006.01)
  *H05K 7/00* (2006.01)

(52) U.S. Cl.
  CPC .......... *G06F 1/1656* (2013.01); *G06F 1/1652* (2013.01)

(58) Field of Classification Search
  CPC ..... G06F 1/1633; G06F 1/1637; G06F 1/1652

USPC ............... 361/679.21–679.3, 679.55, 679.56
See application file for complete search history.

(56) References Cited

U.S. PATENT DOCUMENTS

| | | | |
|---|---|---|---|
| 4,110,003 A * | 8/1978 | Zinn ...................... | G03B 21/58 160/24 |
| 8,001,711 B2 | 8/2011 | Lafarre et al. | |
| 2012/0050075 A1* | 3/2012 | Salmon ................. | G06F 1/1626 341/20 |
| 2016/0187929 A1* | 6/2016 | Kim ...................... | G06F 1/1652 345/184 |

FOREIGN PATENT DOCUMENTS

| KR | 10-2007-0092597 A | 9/2007 |
|---|---|---|
| KR | 10-2010-0016501 A | 2/2010 |
| KR | 20-2011-0003775 U | 4/2011 |

* cited by examiner

*Primary Examiner* — Anthony Haughton
(74) *Attorney, Agent, or Firm* — Lee & Morse, P.C.

(57) ABSTRACT

A rollable display device, including a flexible display panel; a roller having a cylindrical shape, one end of the flexible display panel being fixed to the roller and rolled around the roller, the roller including a penetration part, the penetration part being inclined with respect to a circumferential surface of the roller, the flexible display panel penetrating through the penetration part; and a first guide at a portion adjacent to the penetration part on the circumferential surface of the roller, the first guide guiding the flexible display panel penetrating through the penetration part to be adjacent to an outer surface of the roller.

16 Claims, 4 Drawing Sheets

ROLLABLE DISPLAY DEVICE

CROSS-REFERENCE TO RELATED APPLICATION

Korean Patent Application No. 10-2015-0022410, filed on Feb. 13, 2015, in the Korean Intellectual Property Office, and entitled: "Rollable Display Device," is incorporated by reference herein in its entirety.

BACKGROUND

1. Field

The described technology relates to a display device.

2. Description of the Related Art

In accordance with rapid development of electronic apparatuses and a rapid change of the information age, a smart phone may be capable of enjoying a multimedia function such as portable Internet, viewing a motion picture, listening to music, as well as schedule management. A screen of the smart phone may be gradually enlarged so that various kinds of information may be easily displayed. In accordance with demands of users that may desire use of a larger screen, a tablet apparatus may have a length of 8 inches or more.

SUMMARY

Embodiments may be realized by providing a rollable display device, including a flexible display panel; a roller having a cylindrical shape, one end of the flexible display panel being fixed to the roller and rolled around the roller, the roller including a penetration part, the penetration part being inclined with respect to a circumferential surface of the roller, the flexible display panel penetrating through the penetration part; and a first guide at a portion adjacent to the penetration part on the circumferential surface of the roller, the first guide guiding the flexible display panel penetrating through the penetration part to be adjacent to an outer surface of the roller.

A cross section of the penetration part may have an arc shape.

One end of the first guide may at least partially cover the penetration part.

An end portion of the first guide covering the penetration part may have a same radius of curvature as a radius of curvature of the penetration part.

The first guide may include an elastically deformable material.

The first guide may be formed integrally with the roller.

An end portion of the flexible display panel in the roller may be fixedly coupled to an inner wall of the roller.

The rollable display device may further include a second guide having a plate shape, the second guide enclosing the roller and the first guide, the second guide elastically supporting a portion of the flexible display panel that penetrates through the penetration part, and the second guide being on the outer surface of the roller.

The second guide may have a same radius of curvature as a radius of curvature of the roller.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
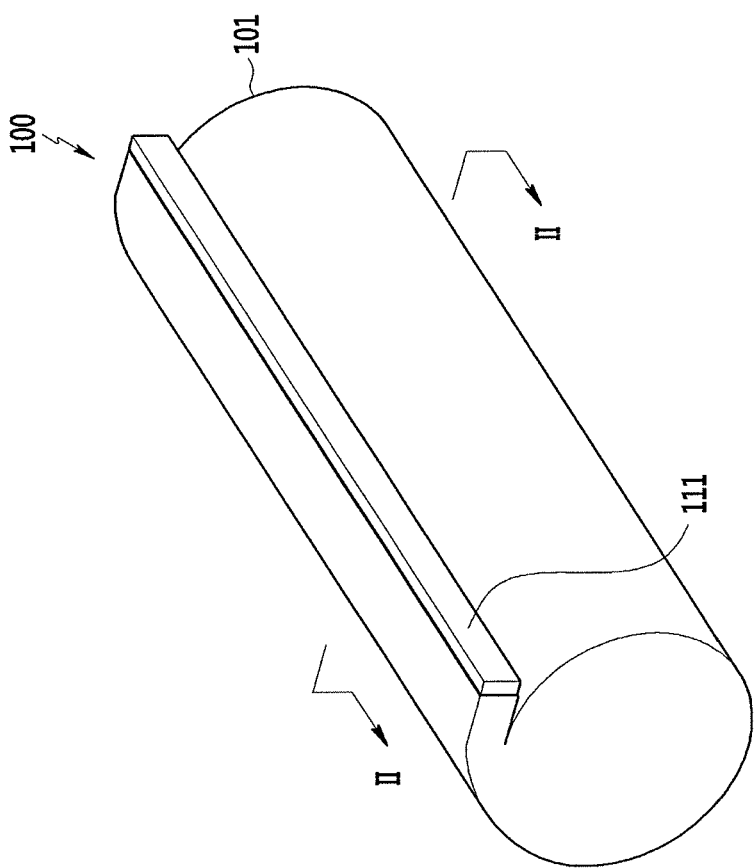
FIG. 1 illustrates a perspective view of a rollable display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and features may be exaggerated for clarity of illustration. Portions unrelated to the description will be omitted in order to obviously describe embodiments, and similar components will be denoted by the same reference numerals throughout the present specification.

In addition, in several exemplary embodiments, components having the same configuration will be representatively described using the same reference numerals in an exemplary embodiment, and only components different from those of an exemplary embodiment will be described in the other exemplary embodiments.

Throughout the present specification, when any one part is referred to as being "connected to" another part, it means that any one part and another part are "directly connected to" each other or are "indirectly connected to" each other with the other part interposed therebetween. In addition, throughout the present specification, unless explicitly described to the contrary, the word "comprise" and variations such as "comprises" or "comprising", will be understood to imply the inclusion of stated elements but not the exclusion of any other elements.

Figure 2:
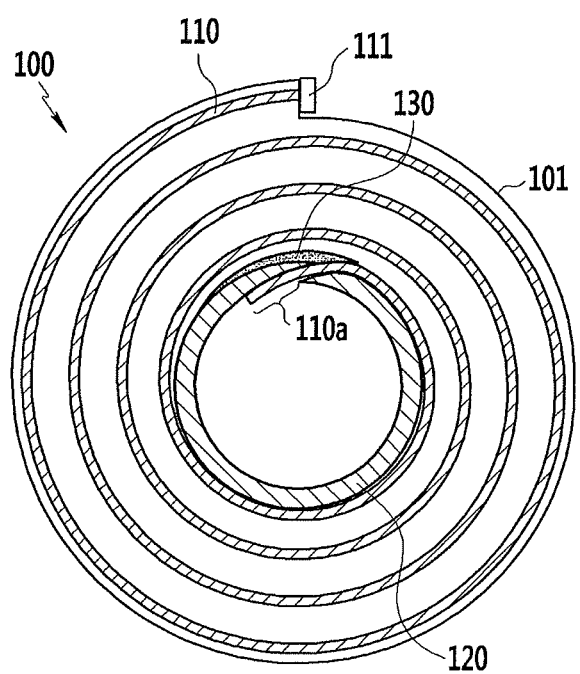
FIG. 2 illustrates a cross-sectional view of the rollable display device according to an exemplary embodiment taken along line II-II of FIG. 1.
Figure 3:
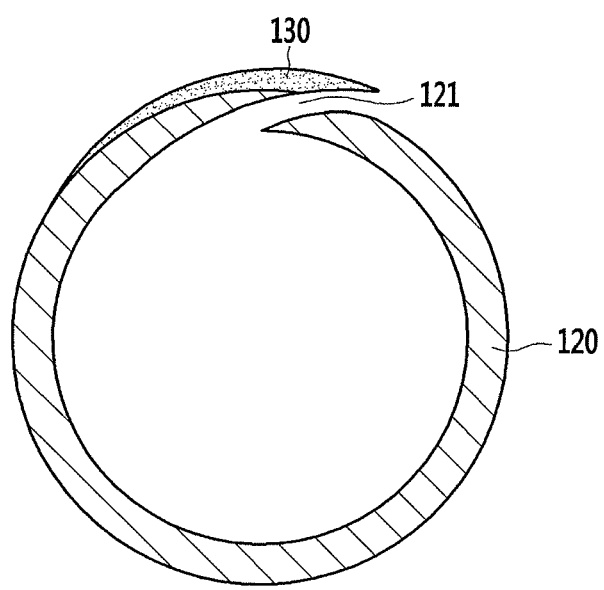
FIG. 3 illustrates a view of only a rolling member and a first guide member in the rollable display device according to an exemplary embodiment shown in FIG. 2.

FIG. 1 illustrates a perspective view of a rollable display device according to an exemplary embodiment, FIG. 2 illustrates a cross-sectional view of the rollable display device according to an exemplary embodiment taken along line II-II of FIG. 1, and FIG. 3 illustrates a view of only a rolling member and a first guide member in the rollable display device according to an exemplary embodiment shown in FIG. 2.

Referring to FIGS. 1 and 3, the rollable display device 100 according to an exemplary embodiment may include a flexible display panel 110, a rolling member 120, and a first guide member 130.

The flexible display panel 110 is a flexible display. The flexible display panel 110 may be made of a flexible material such as plastic to maintain display performance even though it may be bent like paper. The flexible display panel 110 may have one end fixedly coupled to the rolling member 120, and have a knob 111 formed at the other end thereof. A user may seize the knob 111 and then easily unroll the flexible display panel 110.

The rolling member 120 may have a cylindrical shape. One end of the flexible display panel 110 may be fixed to and rolled around the rolling member 120. The rolling member 120 may be, for example, a roller 120.

The rolling member 120 may include a penetration part 121. The penetration part 121 may be formed so as to be inclined with respect to a circumferential surface of the rolling member 120. The flexible display panel 110 may penetrate through the penetration part 121.

The first guide member 130 may be formed at a portion adjacent to the penetration part 121 on the circumferential surface of the rolling member 120. The first guide member 130 may guide the flexible display panel 110 penetrating through the penetration part 121 so as to be positioned adjacent to an outer surface of the rolling member 120.

One end of the first guide member 130 may be positioned so as to cover at least a portion of the penetration part 121, and the flexible display panel 110 passing through the penetration part 121 may be guided by the first guide member 130 to closely adhere to the outer surface of the rolling member 120.

A cross section of the penetration part 121 may have, for example, an arc shape. The cross section of the penetration part 121 may have the arc shape such that the flexible display panel 110 positioned on the outer surface of the rolling member 120 may not be excessively bent, and may be naturally bent while penetrating through the penetration part 121.

An end portion of the first guide member 130 covering the penetration part 121 may be formed at, e.g., having, a radius of curvature that is the same as that of the penetration part 121, and the first guide member 130 may be configured so as to stably enclose an outer surface of the flexible display panel 110 such that the flexible display panel 110 may more closely adhere to the outer surface of the rolling member 120.

The first guide member 130 as described above may be made of, for example, an elastically deformable material.

The first guide member 130 may be formed integrally with the rolling member 120. For example, the first guide member 130 and the rolling member 120 may be formed integrally with each other at a time in a manufacturing process. In an embodiment, the first guide member 130 and the rolling member 120 may be separately manufactured and be then fixed to each other. In terms of ease of manufacture, the first guide member 130 and the rolling member 120 may be manufactured integrally with each other.

The rollable display device 100 according to an exemplary embodiment having the above-mentioned structure may include the rolling member 120 and the first guide member 130, and a part of the flexible display panel 110 coupled to the rolling member 120 may not be excessively bent, and may be bent at only a predetermined angle, in a process in which the flexible display panel 110 is rolled around the rolling member 120 or is unrolled from the rolling member 120. The flexible display panel 110 may not be excessively bent perpendicularly to the rolling member 120, and may be continuously maintained in a state in which it is bent at the predetermined angle, in a process in which the rolling member 120 rotates, and stress may be prevented from being applied to the flexible display panel 110. Therefore, generation of a crack in the flexible display panel 110, for example, due to excessive stress, may be prevented in advance.

Figure 4:
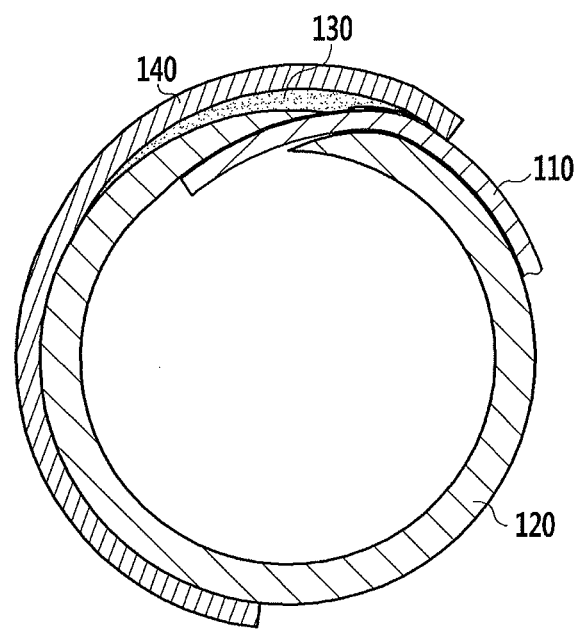
FIG. 4, which illustrates a portion of an inner portion of a rollable display device according to another exemplary embodiment, illustrates a view of a state in which a second guide member is coupled to a circumferential surface of a rolling member.

FIG. 4, which illustrates a portion of an inner portion of a rollable display device according to another exemplary embodiment, illustrates a view of a state in which a second guide member is coupled to a circumferential surface of a rolling member.

Referring to FIG. 4, the rollable display device according to another exemplary embodiment may further include a second guide member 140.

The second guide member 140 may have a plate shape and may be formed so as to enclose the rolling member 120 and the first guide member 130. The second guide member 140 may elastically support a portion of the flexible display panel 110 that may penetrate through the penetration part 121 and may then be positioned on the outer surface of the rolling member 120. The second guide member 140 may have a radius of curvature that is the same as that of the rolling member 120. The center of the second guide member 140 and the center of the rolling member 120 may coincide with each other.

As described above, the second guide member 140 may be configured so as to again enclose the flexible display panel 110 such that the flexible display panel 110 may more stably closely adhere to the circumferential surface of the rolling member 120 without having a space by the second guide member 140.

An end portion 110a of the flexible display panel 110 positioned in the rolling member 120 may be fixedly coupled to an inner wall of the rolling member 120. The end portion 110a of the flexible display panel 110 positioned in the rolling member 120 in FIG. 4 may be fixedly coupled to the inner wall of the rolling member 120 positioned at the left based on the penetration part 121, and the flexible display panel 110 may pass through the penetration part 121 and be then positioned on the circumferential surface of the rolling member 120 positioned at the right based on the penetration part 121.

Returning to FIG. 2, the rollable display device 100 according to an exemplary embodiment having the above-mentioned structure may include a housing 101.

The housing 101 may accommodate the above-mentioned rolling member 120 and flexible display panel 110 therein. The housing 101 may have an internal space formed therein. A shape of the housing 101 may be a pillar shape. In an embodiment, a shape of the housing 101 may be, for example, a cylindrical shape. A grasp sense, e.g., graspability, may be improved in the case in which the housing 101 has a cylindrical shape as compared with in a case in which the housing 101 has a rectangular pillar shape.

The above-mentioned rolling member 120 may be rotatably coupled to an inner portion of the housing 101. In an embodiment, a shaft may be disposed in the housing 101 in order to rotate the rolling member 120. The housing 101 as described above may serve to protect the flexible display panel 110 from the outside.

One side of the housing 101 may be provided with a hole through which a portion of the flexible display panel 110 may enter the housing 101 from the outside and exit from the housing 101 to the outside. A portion of the flexible display panel 110 may be unrolled out through the hole.

The rollable display device 100 according to an exemplary embodiment may be a portable electronic apparatus such as, for example, a mobile phone, a smart phone, a tablet, an electronic book terminal, a personal digital assistant (PDA), a portable multimedia player (PMP), or a digital broadcasting receiver.

By way of summation and review, as screen size of, for example, a smart phone or tablet apparatus, is enlarged, it may be easier to view a motion picture; however, portability may be decreased. A rollable portable terminal may have a form in which a display panel outputting an image is bent or a form in which the display panel is rolled around a roller and is then unrolled from the roller.

In a rollable portable terminal as described above, one end of the display panel may be fixedly coupled to a roller positioned in a main body and may be positioned so as to enclose the roller. However, stress may be applied to a part of the display panel coupled to the roller to thereby be vertically bent. Stress may be continuously applied to the display panel, and a crack may be generated in the display panel.

The described technology relates to a rollable display device in which a display panel is rollable. Provided is a rollable display device that may prevent a crack from being generated in a display panel.

The rollable display device according to an exemplary embodiment may include a rolling member and a first guide member, and a part of the flexible display panel coupled to the rolling member may not be excessively bent, and may be bent at only a predetermined angle, in a process in which the flexible display panel is rolled around the rolling member or is unrolled from the rolling member. The flexible display panel may not be excessively bent perpendicularly to the rolling member, and may be continuously maintained in a state in which it is bent at the predetermined angle, in a process in which the rolling member rotates, and stress may be prevented from being applied to the flexible display panel. Therefore, generation of a crack in the flexible display panel, for example, due to excessive stress, may be prevented in advance.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rollable display device, comprising:
   a flexible display panel;
   a roller having a cylindrical shape, one end of the flexible display panel being fixed to the roller and rolled around the roller, the roller including a penetration part, the penetration part being inclined with respect to a circumferential surface of the roller, the flexible display panel penetrating through the penetration part; and
   a first guide at a portion adjacent to the penetration part on the circumferential surface of the roller, the first guide guiding the flexible display panel penetrating through the penetration part and pressing a part of the flexible display panel that is outside of the penetration part to an outer surface of the roller.

2. The rollable display device as claimed in claim 1, wherein a cross section of the penetration part has an arc shape.

3. The rollable display device as claimed in claim 1, wherein one end of the first guide at least partially covers the penetration part.

4. The rollable display device as claimed in claim 3, wherein an end portion of the first guide covering the penetration part has a same radius of curvature as a radius of curvature of the penetration part.

5. The rollable display device as claimed in claim 1, wherein the first guide includes an elastically deformable material.

6. The rollable display device as claimed in claim 1, wherein the first guide is formed integrally with the roller.

7. The rollable display device as claimed in claim 1, wherein an end portion of the flexible display panel in the roller is fixedly coupled to an inner wall of the roller.

8. The rollable display device as claimed in claim 1, further comprising a second guide having a curved plate shape, the second guide partially enclosing the roller and the first guide, the second guide covering the first guide on the exterior of the penetration part, and the second guide being on and contacting the outer surface of the roller.

9. The rollable display device as claimed in claim 8, wherein the second guide has a same radius of curvature as a radius of curvature of the roller.

10. A rollable display device, comprising:
    a flexible display panel;
    a roller having a cylindrical shape, one end of the flexible display panel being fixed to the roller and rolled around the roller, the roller including a penetration part, the penetration part being inclined with respect to a circumferential surface of the roller, the flexible display panel penetrating through the penetration part; and
    a first guide at a portion adjacent to the penetration part on the circumferential surface of the roller, the first guide guiding the flexible display panel penetrating through the penetration part and pressing a part of the flexible display panel that is outside of the penetration part to an outer surface of the roller,
    wherein one end of the first guide at least partially covers the penetration part, and
    wherein an end portion of the first guide covering the penetration part has a same radius of curvature as a radius of curvature of the penetration part.

11. The rollable display device as claimed in claim 10, wherein a cross section of the penetration part has an arc shape.

12. The rollable display device as claimed in claim 10, wherein the first guide includes an elastically deformable material.

13. The rollable display device as claimed in claim 10, wherein the first guide is formed integrally with the roller.

14. The rollable display device as claimed in claim 10, wherein an end portion of the flexible display panel in the roller is fixedly coupled to an inner wall of the roller.

15. The rollable display device as claimed in claim 10, further comprising a second guide having a curved plate shape, the second guide partially enclosing the roller and the first guide, the second guide covering the first guide on the exterior of through the penetration part, and the second guide being on and contacting the outer surface of the roller.

16. The rollable display device as claimed in claim 15, wherein the second guide has a same radius of curvature as a radius of curvature of the roller.

* * * * *